(12) United States Patent
Kil et al.

(10) Patent No.: US 9,233,656 B2
(45) Date of Patent: Jan. 12, 2016

(54) BUMPER BACK BEAM WITH A FIBER COMPOSITE REINFORCING MATERIAL

(71) Applicant: LG Hausys, Ltd., Seoul (KR)

(72) Inventors: Yong Kil Kil, Cheongju-si (KR);
Yong-Hoon Yoon, Daejeon (KR);
Byoung Heuk Kim, Cheongju-si (KR);
Chun Ho Park, Cheongju-si (KR); Hee June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/362,264

(22) PCT Filed: Dec. 21, 2012

(86) PCT No.: PCT/KR2012/011272
§ 371 (c)(1),
(2) Date: Jun. 2, 2014

(87) PCT Pub. No.: WO2013/095046
PCT Pub. Date: Jun. 27, 2013

(65) Prior Publication Data
US 2014/0333077 A1 Nov. 13, 2014

(30) Foreign Application Priority Data
Dec. 21, 2011 (KR) .................. 10-2011-0139017

(51) Int. Cl.
*B60R 19/03* (2006.01)
*B60R 19/18* (2006.01)

(52) U.S. Cl.
CPC .................. *B60R 19/03* (2013.01); *B60R 19/18* (2013.01); *B60R 2019/1853* (2013.01)

(58) Field of Classification Search
CPC .............................. B60R 19/18; B60R 19/03
USPC .................................... 293/120, 122
See application file for complete search history.

(56) References Cited

U.S. PATENT DOCUMENTS 5,123,688 A * 6/1992 Takado et al. ............... 293/120
5,141,273 A * 8/1992 Freeman .................... 293/122

FOREIGN PATENT DOCUMENTS

| EP | 0652138 A1 | 5/1995 |
| JP | 01101132 A | 4/1989 |

(Continued)

OTHER PUBLICATIONS

International Search Report for PCT/KR2012/011272 mailed on Apr. 5, 2013.

(Continued)

*Primary Examiner* — Joseph D Pape
(74) *Attorney, Agent, or Firm* — Hauptman Ham, LLP

(57) ABSTRACT

The present disclosure relates to a bumper back beam to be disposed inside a bumper cover, for reducing impact from outside the bumper cover. The bumper back beam includes a body including a synthetic resin, and a fiber composite reinforcing material including a hollow section. The fiber composite reinforcing material is fastened inside the body. The bumper back beam has high reliability, by having excellent ability to absorb impact energy because cracks almost do not occur during collision since it not only provides satisfactory strength and stiffness but also has high elongation with synthetic resin and fiber composite reinforcing materials generating synergies, and especially by having excellent impact resistance since fiber composite reinforcing materials take the shape of a hollow section.

13 Claims, 8 Drawing Sheets

(56) References Cited

FOREIGN PATENT DOCUMENTS

| JP | 0487855 A | 3/1992 |
| JP | 06320656 A | 11/1994 |
| JP | 1019950700182 A | 1/1995 |
| JP | 07237512 A | 9/1995 |
| JP | 08108812 A | 4/1996 |
| JP | 09011323 A | 1/1997 |
| JP | 2003251633 A | 9/2003 |
| JP | 2006159682 A | 6/2006 |
| KR | 1020020094664 A | 12/2002 |

OTHER PUBLICATIONS

Japanese Office Action dated Jun. 2, 2015 in connection with the counterpart Japanese Patent Application No. 2014-548675.

Chinese Office Action dated Aug. 5, 2015 in connection with the counterpart Chinese Patent Application No. 201280063756.X.

* cited by examiner

BUMPER BACK BEAM WITH A FIBER COMPOSITE REINFORCING MATERIAL

CROSS REFERENCE TO RELATED APPLICATION

This application claims the priority of Korean Patent Application No. 10-2011-0139017 filed on Dec. 21, 2011 in the Korean Patent and Trademark Office. Further, this application is the National Phase application of International Application No. PCT/KR2012/011272 filed on Dec. 21, 2012, which is incorporated herein by reference in its entirety.

TECHNICAL FIELD

The present invention relates to a bumper back beam being equipped with a fiber composite reinforcing material with hollow section inside and a bumper having the same.

BACKGROUND ART

A bumper installed at front and back of a vehicle is an impact absorbing device protecting the vehicle and passengers in some degrees by primarily absorbing impact when the vehicle collides. These bumpers comprise a bumper back beam fastened on a body frame of a vehicle through a bumper stay, an impact absorbing foam fastened on the front side of the bumper back beam, and a bumper cover fastened on a bumper with the impact absorbing foam in between.

There are a variety of bumper back beams, such as a type illustrated in FIG. 1.

FIG. 1 is a drawing illustrating a prior disassembled bumper back beam.

As illustrated, a prior back beam comprises a main body (11) fastened inside a bumper cover (not illustrated), and a stay (12) to connect the main body to a frame of a vehicle.

The main body (11) is formed by a fiber composite reinforcing material, and cross sectional shape of line A-A assumes a form of an open shape.

For example, it is what has a "U" similar shaped cross section. The reason for forming main bodies with fiber composite reinforcing materials as described above is to reduce the weight of vehicles.

Prior back beams formed with fiber composite reinforcing materials are generally made by combining glass fiber with synthetic resin and physical characteristics such as strength, stiffness, and fracture elongation depends on the glass fiber. That is, strength and stiffness of a back beam using fiber composite reinforcing materials greatly increases compared to back beam made of only synthetic resin, but elongation sharply decreases. Due to the described reason, when impact load applied to a fiber composite reinforcing material back beam is not high, absorbing impact energy of back beams are effective due to influence from high strength and stiffness, but there are disadvantages that efficiency of impact energy absorption may sharply decrease because it easily cracks because elongation is rather poor at high impact loads.

DISCLOSURE

Technical Problem

The present invention is provided to solve the described problems, and the objective is to provide a bumper back beam being equipped with a fiber composite reinforcing material with hollow section inside and a bumper having the same with high reliability, by having excellent ability to absorb impact energy because cracks almost do not occur during collision since it not only provides satisfactory strength and stiffness but also has high elongation with synthetic resin and fiber composite reinforcing materials generating synergies, and especially by having excellent impact resistance since fiber composite reinforcing materials take the shape of a hollow section.

Technical Solution

A bumper back beam being equipped with a fiber composite reinforcing material with hollow section inside according to the present invention to achieve the above described objective, comprises a body formed with a synthetic resin, and a fiber composite reinforcing material with hollow section that is fastened inside the body, wherein the bumper back beam, as being built inside a bumper cover, reduces impact coming in from outside.

Also, the fiber composite reinforcing material extends longitudinally and has a polygonal cross sectional shape.

Also, the fiber composite reinforcing material is manufactured by mixing and melting a glass fiber or carbon fiber based continuous fiber with a synthetic resin, followed by extruding.

Furthermore, the fiber composite reinforcing material is manufactured by mixing and melting a glass fiber or carbon fiber based continuous fiber and a single fiber with a synthetic resin, followed by extruding.

Also, the fiber composite reinforcing material comprises 60 weight % to 70 weight % of a continuous fiber, and 30 weight % to 40 weight % of a synthetic resin.

Also, a synthetic resin introduced into the fiber composite reinforcing material and a synthetic resin forming a body are a thermoplastic resin.

Furthermore, the synthetic resin is any of polycarbonate, poly-butylene-terephthalate, or polypropylene.

Also, the fiber composite reinforcing material expands longitudinally and has a curved shape.

Also, the fiber composite reinforcing material comprises a main part being housed entirely inside the body through insert injection molding and providing stiffness outward, and a connecting part having a stripe shape with constant width and thickness and being formed to be integrated into a side of the main part.

Also, the connecting part forms multiple through holes passing synthetic resin, which forms the body, through in a melting state during insert injection molding.

Also, the body further comprises a glass fiber combined with a synthetic resin.

Also, a bumper of the present invention to achieve the described objective comprises a body formed with a synthetic resin and a fiber composite reinforcing material with hollow section that is fastened inside the body, wherein the bumper back beam, as being built inside a bumper cover, reduces impact coming in from outside.

Advantageous Effects

A bumper back beam being equipped with a fiber composite reinforcing material with hollow section inside and a bumper having the same of the present invention as described has high reliability, by having excellent ability to absorb impact energy because cracks almost do not occur during collision since it not only provides satisfactory strength and stiffness but also has high elongation with synthetic resin and fiber composite reinforcing materials generating synergies, and especially by having excellent impact resistance since fiber composite reinforcing materials take the shape of a hollow section.

BEST MODE

Hereinafter, an embodiment of the present invention will be described in detail in reference to accompanying drawings.

Figure 1:
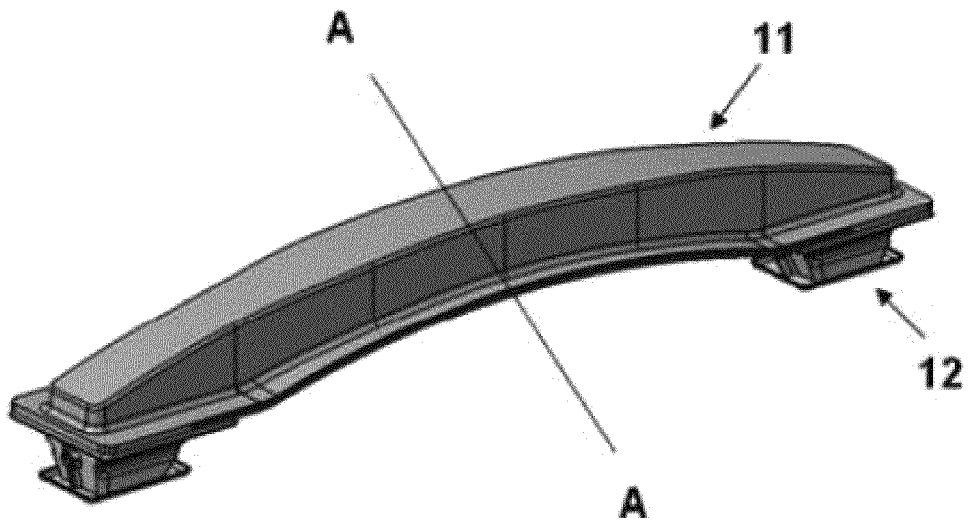
FIG. 1 is a drawing illustrating a prior bumper back beam.
Figure 2:
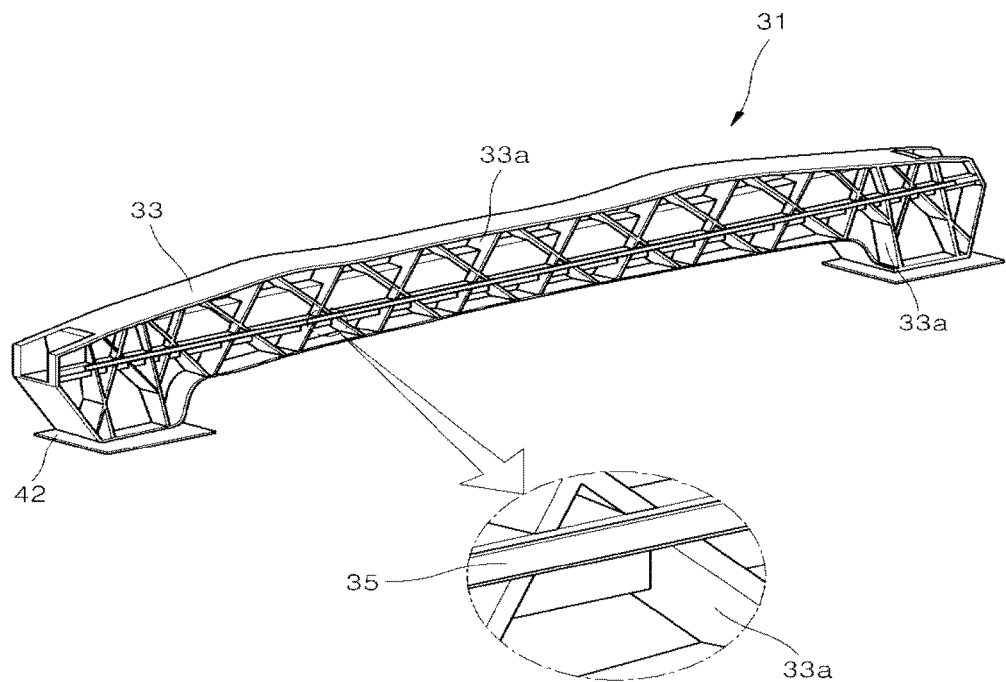
FIG. 2 is a perspective view of a bumper back beam in accordance with an embodiment of the present invention, inside which a fiber composite reinforcing material is equipped.
Figure 3:
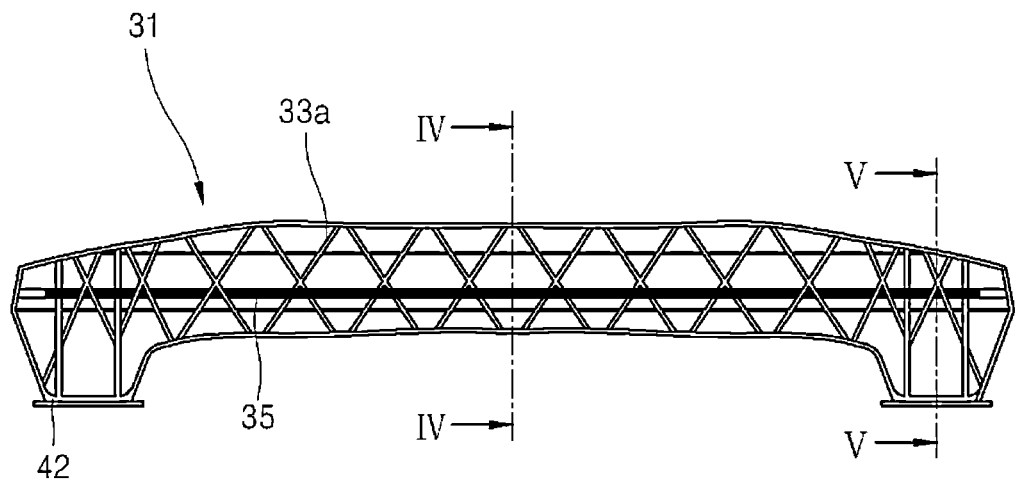
FIG. 3 is a front view illustrating a bumper back beam of FIG. 2.

FIG. 2 is a perspective view of a bumper back beam in accordance with an embodiment of the present invention, inside which a fiber composite reinforcing material is equipped, and FIG. 3 is a front view illustrating the bumper back beam of FIG. 2.

As illustrated, the bumper back beam (31), inside which the fiber composite reinforcing material (35) in accordance with an embodiment of the present invention is equipped, comprises a body (33) mold manufactured with a synthetic resin and fastened to a body frame (45 of FIG. 15) through a bumper stay (42), and a fiber composite reinforcing material (35) fastened inside the body (33) through insert injection molding while the body (33) is manufactured. In FIG. 2, a part of the fiber composite reinforcing material (35) is exposed at the side of the body (33).

In the first place, the body (33) is formed with a synthetic resin such as polycarbonate, poly-butylene-terephthalate, polypropylene, etc., and multiple X shaped reinforcement ribs (33a) are formed on both side surfaces, and also the bumper stay (42) is fastened on the lower parts of both end portions on the drawing. And of course, the size and the shape of the body (33) differ according to models of vehicles.

Also, the fiber composite reinforcing material (35) is manufactured through extruding and pressing a continuous fiber and a synthetic resin in a mixed and melted state. The continuous fiber uses glass fibers or carbon fibers, and polypropylene or polycarbonate may be used for the synthetic resin.

Furthermore, it is preferable for the mixing ratio of the continuous fiber and the synthetic resin to be 7:3 to 6:4 for the continuous fiber to the synthetic resin.

In some cases, a continuous fiber and a single fiber may be applied together.

A structure of the fiber composite reinforcing material (35) will be described through FIG. 6 in the first place.

Figure 6:
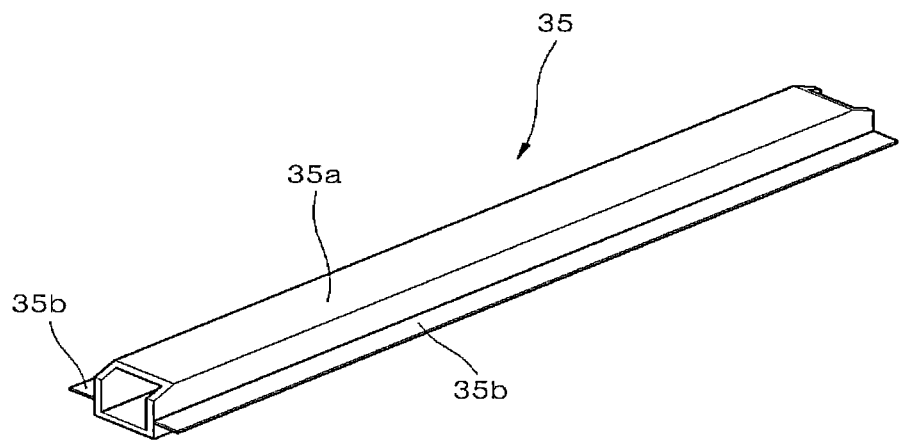
FIG. 6 is a perspective view separately illustrating a fiber composite reinforcing material equipped in a bumper back beam illustrated in FIG. 2.

FIG. 6 is a perspective view separately illustrating the fiber composite reinforcing material equipped in a bumper back beam illustrated in FIG. 2.

As illustrated, the fiber composite reinforcing material (35) comprises a main part (35a) extending longitudinally and having a constant cross sectional shape in the direction of the extension, and a connecting part (35b) formed to be integrated into both side surfaces of the main body part (35a) and leveling.

The main body part (35a) roughly has a shape of a square pipe, and the connecting part (35b) has a shape of a stripe with constant width and thickness. As described above, the fiber composite reinforcing material (35) with the above described shape is manufactured by mixing and melting a continuous fiber and a synthetic resin, followed by extruding and multi stage pressing.

The reason for forming the connecting part (35b) on both sides of the main body part (35a) is to maximize the contact areas of the fiber composite reinforcing material (35) with respect to the body (33), and increase the combining force of the body (33) with respect to the fiber composite reinforcing material (35).

Also, as mentioned above, the fiber composite reinforcing material (35) is equipped inside the body through insert injection molding. Especially as illustrated in FIG. 4 and FIG. 5, the main body part (35a) having a shape of a square hollow pipe is included entirely inside the body (33).

Figure 4:
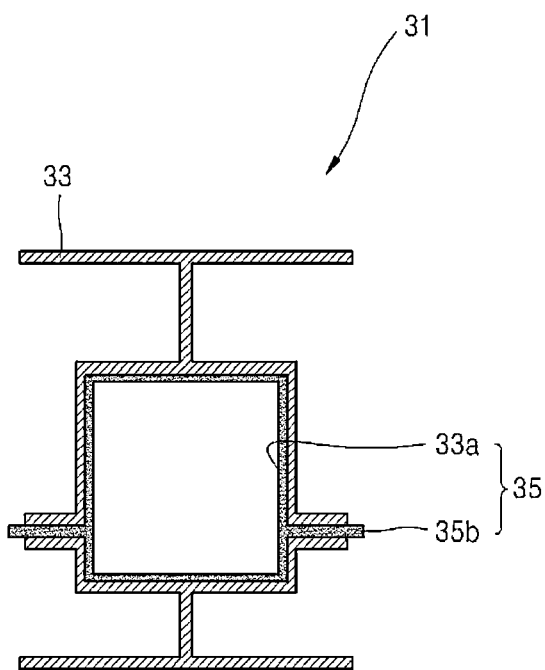
FIG. 4 is a cross sectional view of line IV-IV of FIG. 3.
Figure 5:
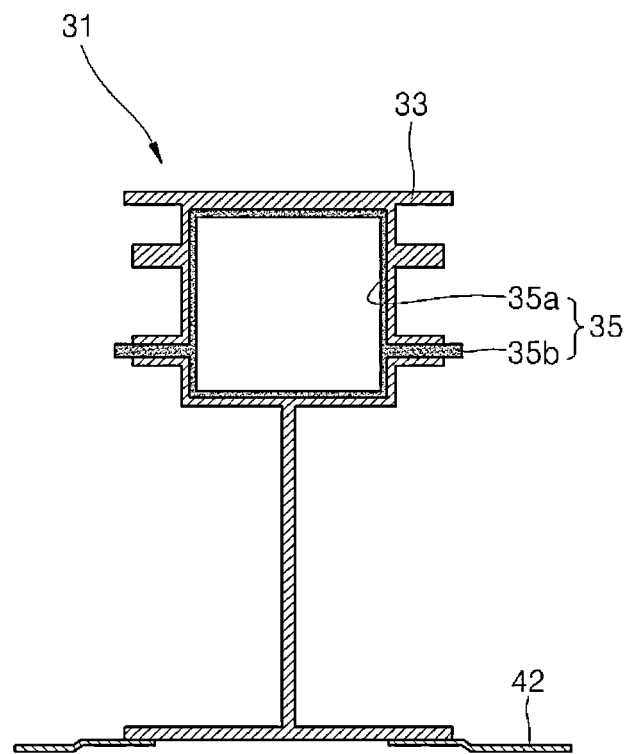
FIG. 5 is a cross sectional view of line V-V of FIG. 3.

FIG. 4 is a cross sectional view of line IV-IV of FIG. 3, and FIG. 5 is a cross sectional view of line V-V of FIG. 3. Referring to FIG. 4, it may be observed that the main body part (35a) in the shape of a square pipe is equipped inside the body (33), and upper and lower surfaces of the connecting part (35b) are wrapped to be in contact with the body (33) maintain to be leveled.

This structure is realized through an insert injection molding process. That is, it is obtained by positioning the previously manufactured fiber composite reinforcing material (35) inside an injection mold, and further injecting a synthetic resin in a melting state inside a mold.

Especially, since the main body part (35a) has a shape of a square, section modulus of the main body part (35a) is high and thus maximizing stiffness of the bumper back beam (31).

Figure 7:
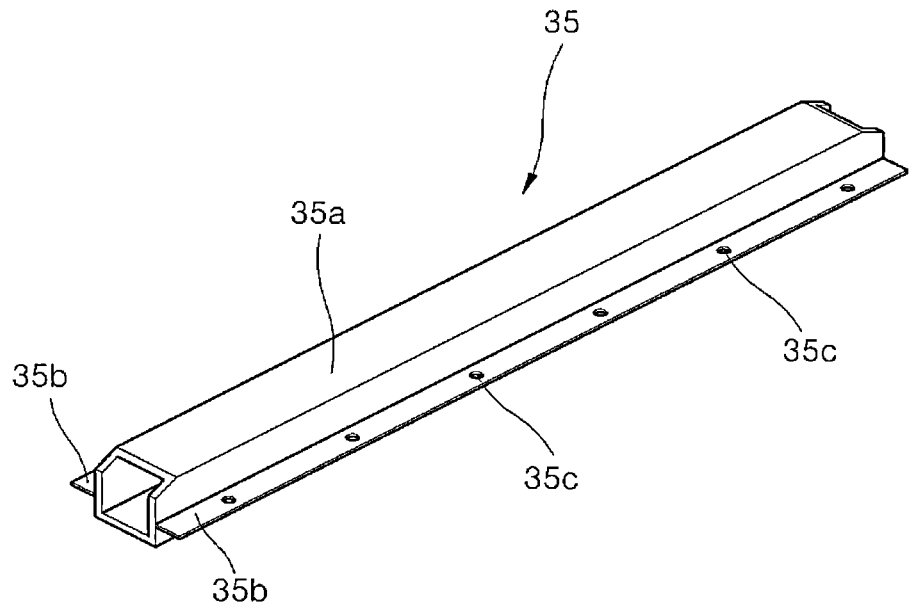
FIG. 7 is a perspective view illustrating another example of a fiber composite reinforcing material illustrated in FIG. 6.

FIG. 7 is a perspective view illustrating another type of a fiber composite reinforcing material (36) that may be applied to the bumper back beam (31) in accordance with the present invention.

Hereinafter, drawing symbols same as the described drawing symbols indicates identical materials.

Referring to the drawings, it may be observed that multiple through holes (35c) are formed on the connecting part (35b). The through hole (35c) is a hole through which a synthetic resin passes through when injecting the synthetic resin in a melting state inside a mold after the fiber composite reinforcing material (36) is positioned inside the mold (not illustrated) for insert injection molding.

As such, combination of the fiber composite reinforcing material (36) with respect to the body (33) further strengthens as through hole (35c) is formed on the connecting part (35b). This will be described in FIG. 8 and FIG. 9 below.

Figure 8:
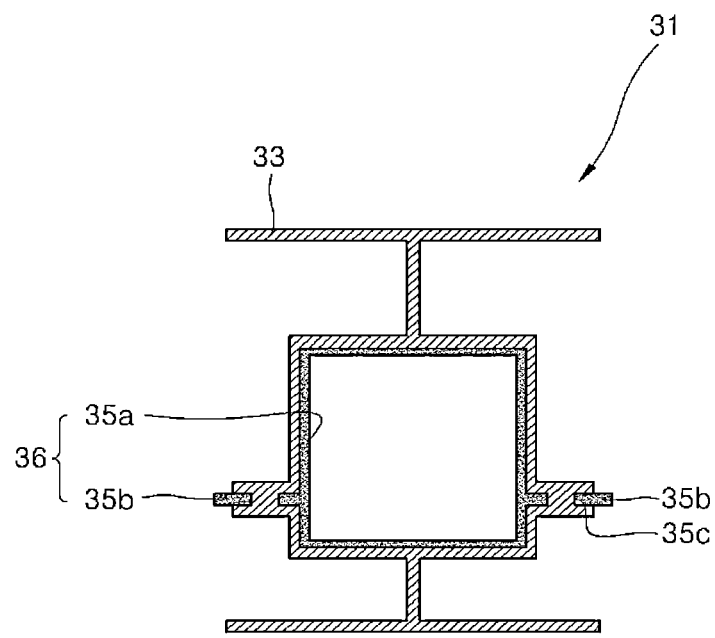
FIG. 8 and FIG. 9 is a drawing illustrated to describe characteristics of type of a fiber composite reinforcing material illustrated in FIG. 7.
Figure 9:
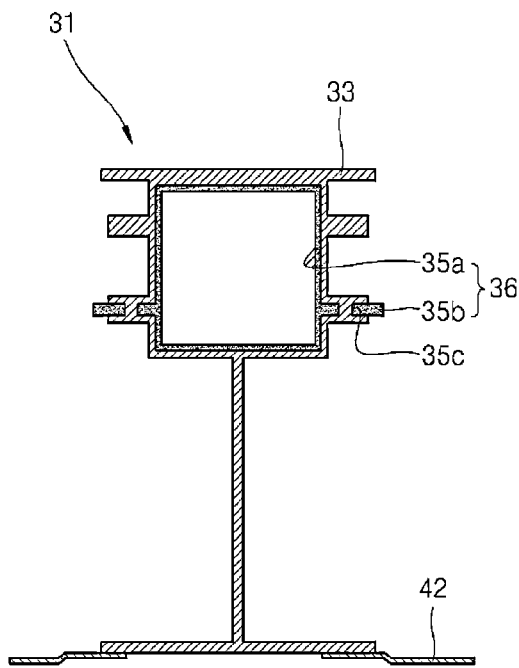

FIG. 8 and FIG. 9 is drawings illustrated to describe characteristics of a type of the fiber composite reinforcing material (36) illustrated the FIG. 7.

As illustrated, a portion of the body is filled inside the through hole (35c) formed on the connecting part (35b). What is filled in the through hole (35c) is a part where a synthetic resin is hardened, which is injected into an injection mold in a melting state during insert injection molding, and maintains the attachment of a fiber composite reinforcing material (36) with respect to a body (33) further solidly. Therefore, as an example, a slipping phenomenon for the fiber composite reinforcing material (36) with respect to a body (33) hardly occurs even if the bending force is applied to the bumper back beam (31).

Figure 10:
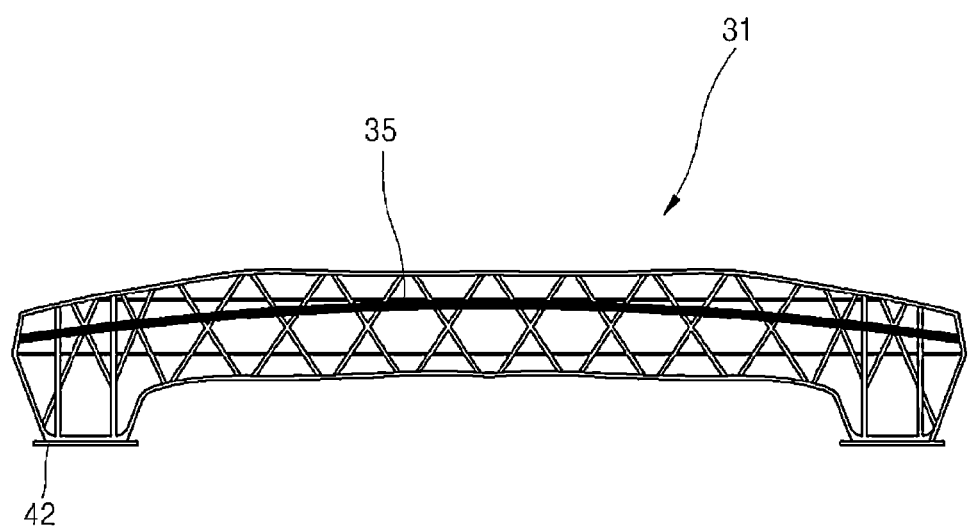
FIG. 10 is a front view illustrating another example of a bumper back beam equipped with a fiber composite reinforcing material in accordance with an embodiment of the present invention.
Figure 11:
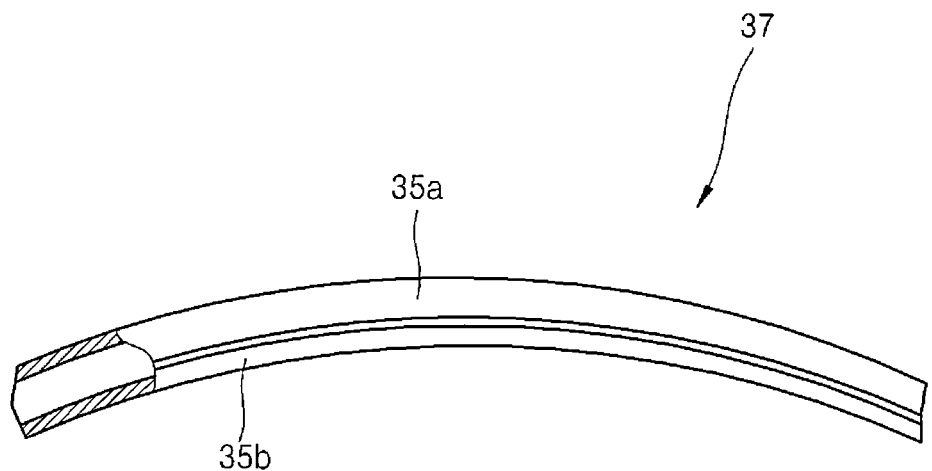
FIG. 11 is a partial cutoff front view of a fiber composite reinforcing material equipped in a bumper back beam illustrated in FIG. 10.

FIG. 10 is a front view illustrating another example of the bumper back beam equipped with the fiber composite reinforcing material in accordance with an embodiment of the present invention, and FIG. 11 is a partial cutoff front view of the fiber composite reinforcing material equipped in the bumper back beam illustrated in FIG. 10.

Referring to the drawings, it may be observed that the fiber composite reinforcing material (37) is extended longitudinally and curved in an arc shape. The curvature of the curved fiber composite reinforcing material (37) differs according to the design of the bumper back beam (31). In any case, and of course, by curving the fiber composite reinforcing material (37) as described above, it may more actively cope with impact coming in from outside.

Figure 12:
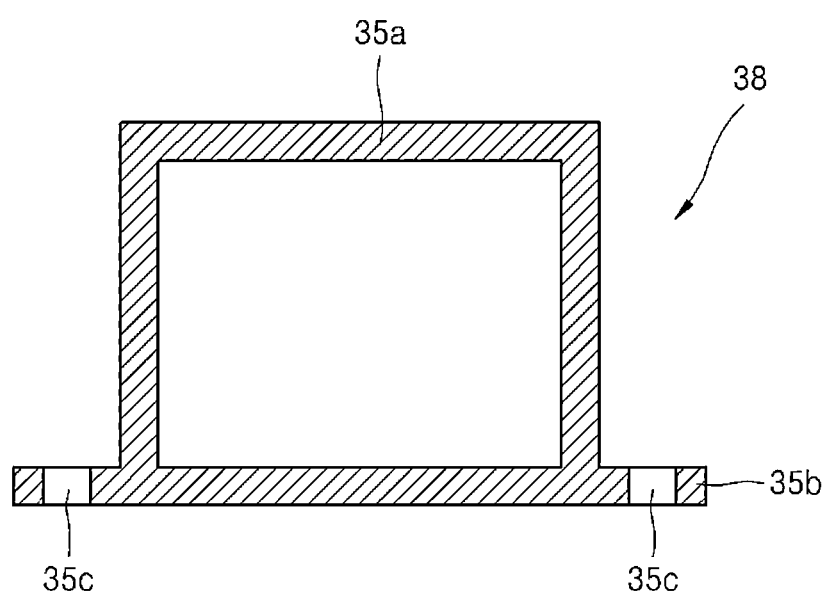
FIG. 12 to FIG. 14 are drawings illustrating cross sections of a variety of different shapes of a fiber composite reinforcing material that may be applied to a bumper back beam equipped with a fiber composite reinforcing material inside in accordance with an embodiment of the present invention.
Figure 13:
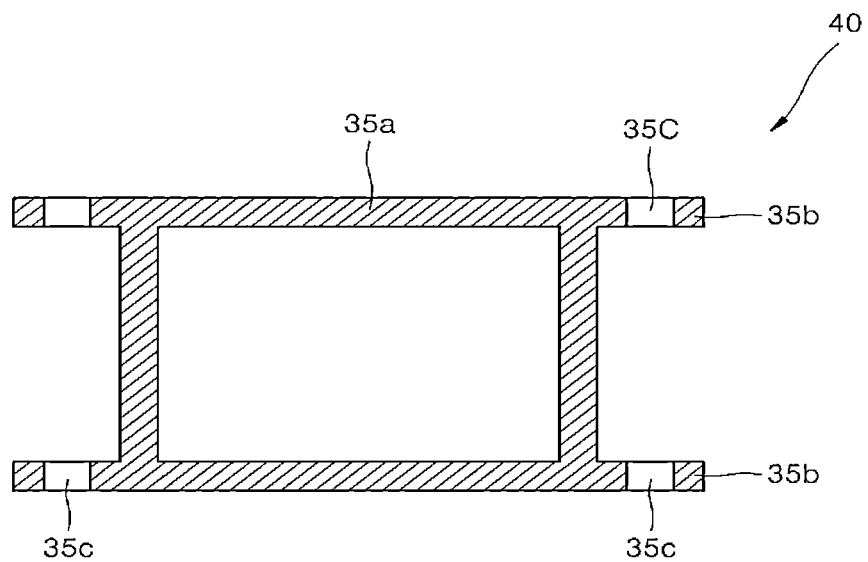
Figure 14:
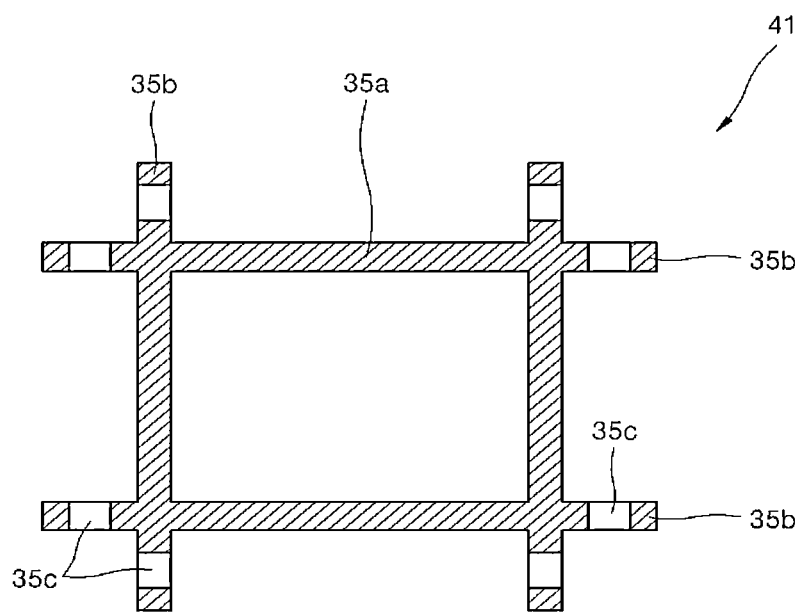

FIG. 12 to FIG. 14 are drawings illustrating cross sections of a variety of different shapes of the fiber composite reinforcing materials that may be applied to the bumper back beam (31) equipped with the fiber composite reinforcing material in accordance with an embodiment of the present invention. All of the materials of the illustrated variety of different shapes of fiber composite reinforcing materials are identical.

The type of fiber composite reinforcing material (38) illustrated in FIG. 12 comprises the main body part (35a) having a shape of a square and extending longitudinally and thus having a shape of a square pipe, and the horizontal connecting part (35b) fastened to be integrated into one body on the lower parts of both side surfaces of the main body part (35a). And, of course, the multiple through holes (35c) are formed on the connecting part (35b). Also, the fiber composite reinforcing material (40) illustrated in FIG. 13 is identical to the fiber composite reinforcing material (38) of FIG. 12, but is different in that the connecting part (35b) is added on the upper part of both side surfaces. That is, the fiber composite reinforcing material (40) of FIG. 14 has four connecting parts (35b) in all. And, of course, the multiple through holes (35c) are formed for each of the connecting parts (35b).

The fiber composite reinforcing material illustrated in FIG. 14 roughly assumes a shape of a sharp (#). That is, two connecting parts (35b) are formed at the right angle for each four edges of the main body part (35a).

Figure 15:
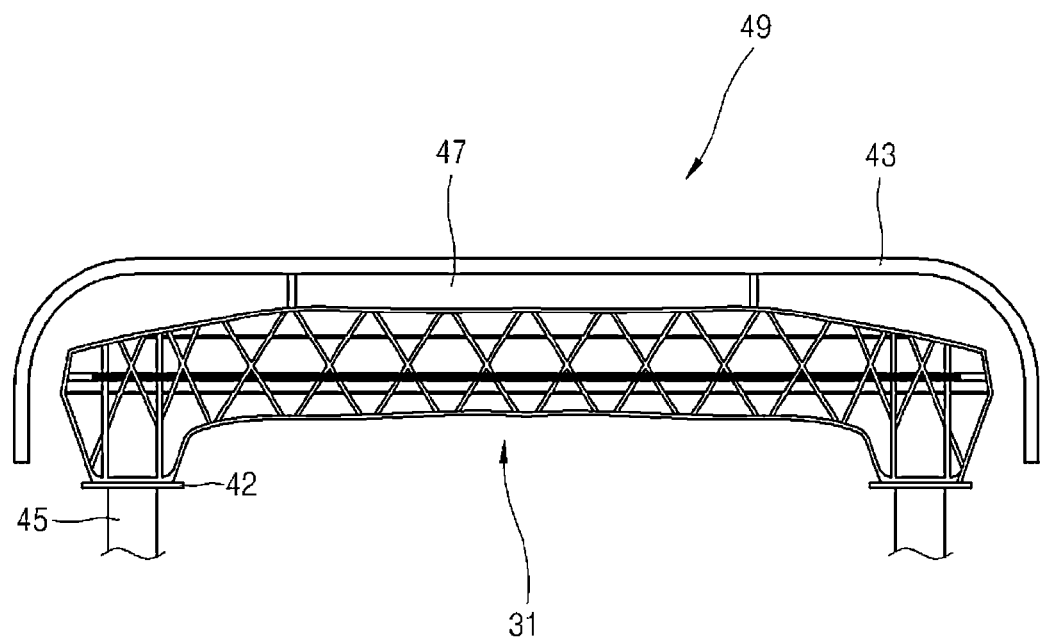
FIG. 15 is a schematic drawing illustrating a bumper in accordance with an embodiment of the present invention.

FIG. 15 is a drawing roughly illustrating the bumper in accordance with an embodiment of the present invention.

As illustrated, the bumper (49) in accordance with an embodiment comprises a bumper back beam (31) fastened to a body frame of a vehicle body through a bumper stay (42), an impact absorbing foam (47) equipped in front of the bumper back beam (31), and a bumper cover (43) fastened on front of a bumper back beam with the impact absorbing foam (47) in between. The impact absorbing foam (47) is a material with same elastic force with a foam rubber or a urethane foam.

A bumper in accordance with an embodiment with a structure described above may effectively reduce impact coming in from outside by effect of the fiber composite reinforcing material (35) and the body (33) comprising the bumper back beam (31).

Although detailed embodiments in accordance with the present invention have been described herein, it should be understood that various modifications, variations and alterations can be made without departing from the spirit and scope of the invention.

The invention claimed is:

1. A bumper back beam to be disposed inside a bumper cover for reducing impact from outside the bumper cover, the bumper back beam comprising:
    a body comprising a synthetic resin; and
    a fiber composite reinforcing material comprising a hollow section, wherein the fiber composite reinforcing material is fastened inside the body,
    wherein the fiber composite reinforcing material further comprises:
        a main part being housed entirely inside the body through insert injection molding and configured to provide stiffness against impact from outside the bumper cover; and
        a connecting part having a bar shape with a constant width and thickness, and integrated into and disposed on a side of the main part, and
    wherein the connecting part comprises multiple through holes configured for the synthetic resin to pass through, when the synthetic resin is in a melting state during the insert injection molding.

2. A bumper back beam according to claim 1, wherein the fiber composite reinforcing material extends longitudinally and has a polygonal cross sectional shape.

3. A bumper back beam according to claim 1, wherein the fiber composite reinforcing material is manufactured by mixing and melting a glass fiber or carbon fiber based continuous fiber with a synthetic resin, followed by extruding.

4. A bumper back beam according to claim 1, wherein the fiber composite reinforcing material is manufactured by mixing and melting a glass fiber or carbon fiber based continuous fiber and a single fiber, with a synthetic resin, followed by extruding.

5. A bumper back beam according to claim 3, wherein the fiber composite reinforcing material comprises 60% by weight to 70% by weight of the continuous fiber, and 30% by weight to 40% by weight of the synthetic resin introduced into the fiber composite reinforcing material.

6. A bumper back beam according to claim 3, wherein the synthetic resin introduced into the fiber composite reinforcing material and the synthetic resin of the body are a thermoplastic resin.

7. A bumper back beam according to claim 6, wherein each of the synthetic resins is any of polycarbonate, poly-butylene-terephthalate, or polypropylene.

8. A bumper back beam according to claim 1, wherein the fiber composite reinforcing material expands longitudinally and has a curved shape.

9. A bumper back beam according to claim 1, wherein the body further comprises a glass fiber combined with the synthetic resin.

10. A bumper comprising the bumper back beam according to claim 1.

11. A bumper back beam according to claim 4, wherein the fiber composite reinforcing material comprises 60% by weight to 70% by weight of the continuous fiber, and 30% by weight to 40% by weight of the synthetic resin introduced into the fiber composite reinforcing material.

12. A bumper back beam according to claim 4, wherein the synthetic resin introduced into the fiber composite reinforcing material and the synthetic resin of the body are a thermoplastic resin.

13. A bumper back beam according to claim 12, wherein each of the synthetic resins is any of polycarbonate, polybutylene-terephthalate, or polypropylene.

* * * * *